Jan. 19, 1954  H. L. GARNIER ET AL  2,666,418
MEANS FOR BALANCING PISTON ENGINES
Filed Feb. 1, 1949
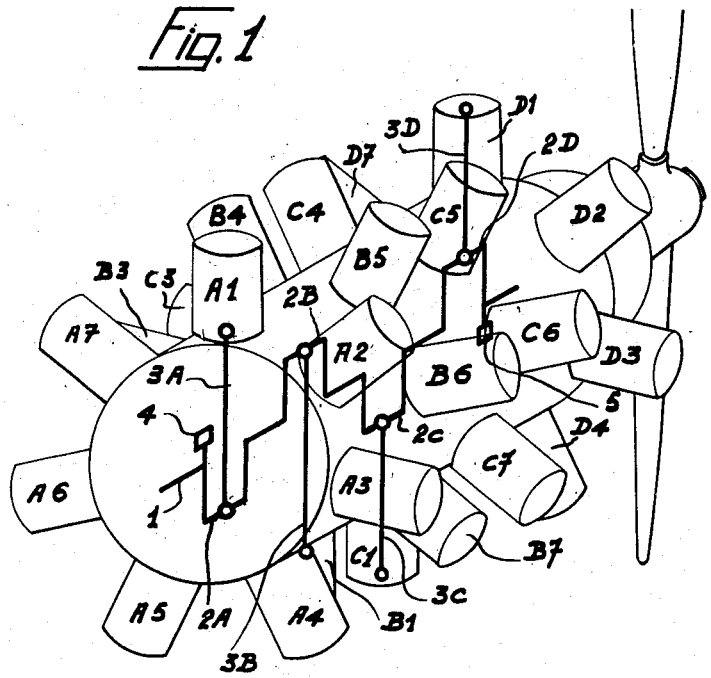
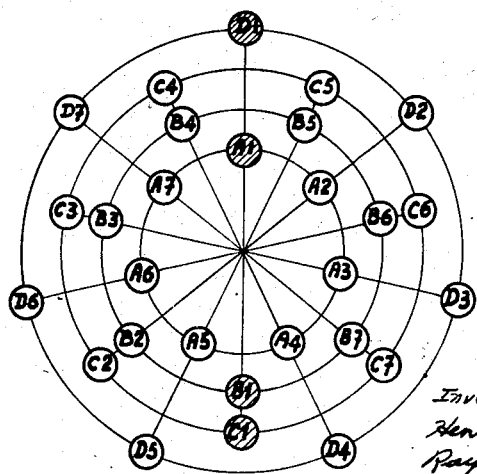

Patented Jan. 19, 1954

2,666,418

UNITED STATES PATENT OFFICE 2,666,418

MEANS FOR BALANCING PISTON ENGINES

Henri L. Garnier and Raymond H. Marchal, Paris, France, assignors to Societe Nationale d'Etude et de Construction de Moteurs d'Aviation, Paris, France, a company of France Application February 1, 1949, Serial No. 73,914

Claims priority, application France February 10, 1948

1 Claim. (Cl. 121—120)

It is known to improve the balance of piston engines and more particularly of internal combustion radial engines comprising at least one row of cylinders and a crankshaft with one crank pin, by combining in each row an even number of cylinders arranged in groups of two reciprocating opposed cylinders, two master rods connected to any two opposed cylinders and pivotally linked to said crank pin and auxiliary rods respectively conected to each of the other cylinders and pivotally linked to one of said master rods in such a manner that alternate cylinders are connected to the same master rod.

This invention relates to an improvement of such arrangement, characterized by the combination comprising four parallel rows each of them including the same number of cylinders and pistons regularly distributed, a crankshaft having four crank pins, one for each of said rows, said crank pins lying in a common plane and successively angularly spaced by 180°, an articulated connecting rod assembly including one master rod and auxiliary rods connecting the cylinders of each row to the corresponding crank pin, the four cylinders associated with the master rods having their axes lying in a common axial plane, the two innermost adjacent master rod cylinders lying on one side of the crankshaft and the two outermost master rod cylinders lying on the opposite side of the crankshaft, and counterweights arranged in opposition on said crankshaft in the axial plane containing said crank pins, said counterweights being adapted to compensate the inertia forces of the first order.

In the drawing:

Figure 1 shows diagrammatically, in perspective view, a four-row engine according to the invention;

Figure 2 is a diagram illustrating the relationship of the crank pin spacing to the cylinder spacing and the cylinder firing order, this diagram showing the projections of the cylinder axes on a plane normal to the crankshaft axis.

The engine shown in the drawing comprises four rows A, B, C, D of cylinders in radial arrangement, each row including a same odd number (seven in the illustrated example) of cylinders regularly distributed about the axis of rotation of the engine, these cylinders being indicated by the references A1 . . . A7, B1 . . . B7, C1 . . . C7, and D1 . . . D7. The axes of the cylinders of the first and fourth rows A and D on the one hand, and of the second and third rows B and C on the other hand, are in parallel relationship; however, the cylinders of rows A and D are in staggered arrangement relatively to the cylinders of rows B and C.

The pistons (not shown) of these cylinders are connected to a crankshaft 1 having four successive crank pins 2A, 2B, 2C, 2D corresponding, respectively, to each row of cylinders, the adjacent crank pins being opposed to each other, i. e., they are angularly spaced by 180°. The seven pistons of each row are connected to the corresponding crank pin through a conventional articulated connecting rod assembly including one master rod 3A, 3B, 3C, 3D, respectively, and six auxiliary rods (which have not been shown for clearness sake) pivotally linked to said master rod.

The cylinders corresponding to the successive master rods have been indicated as A1, B1, C1, D1, the axes of these four cylinders lying in a common axial plane. Moreover, the two innermost cylinders B1 and C1 lie on the same side of the crankshaft 1, while the two outermost cylinders A1 and D1 lie on its opposite side.

Counterweights 4 and 5 fast with the crankshaft 1 are arranged in opposition with each other, in the axial plane containing the crank pins 2A, 2B, 2C, 2D, these counterweights being determined so as to balance the inertia forces of the first order occurring in the engine.

In this manner the inertia forces resulting from the motion of the pistons and rod assembly of the first row A are balanced by those occurring in the third row C, while the inertia forces occurring in the second row B are balanced by those occurring in the fourth row D, except the forces of the first order, which are balanced by counterweights 4 and 5 as stated above.

Having thus described the invention, what is claimed as new and desired to be secured by Letters Patent is:

In a four row radial engine having the same odd number of cylinders and pistons regularly distributed in each row, the axes of the cylinders of the first and fourth rows being in parallel relationship, the axes of the cylinders of the second and third rows being also in parallel relationship but in staggered arrangement relatively to the axes of the cylinders of the first and fourth rows, a crankshaft having four crank pins, one for each of said rows, said crank pins lying in a common plane and successively angularly spaced by 180°, an articulated connecting rod assembly including one master rod and auxiliary rods connecting the cylinders of each row to the corresponding crank pin, the four cylinders associated with the master rods having their axes lying in a common axial plane, the two innermost, adjacent master rod cylinders lying on the same side of the crankshaft and the two outermost master rod cylinders lying on the opposite side of the crankshaft, and counterweights arranged in opposition on said crankshaft in the axial plane containing said crank pins, said counterweights being adapted to compensate the inertia forces of the first order.

HENRI L. GARNIER.
RAYMOND H. MARCHAL.

References Cited in the file of this patent

UNITED STATES PATENTS

| Number | Name | Date |
|---|---|---|
| 1,534,411 | Potter | Apr. 21, 1925 |
| 1,861,380 | Brewer | May 31, 1932 |
| 2,195,550 | Williams | Apr. 2, 1940 |
| 2,256,094 | Lynch | Sept. 16, 1941 |
| 2,426,875 | Hasbrouck et al. | Sept. 2, 1947 |

FOREIGN PATENTS

| Number | Country | Date |
|---|---|---|
| 710,140 | Germany | Sept. 5, 1941 |